Figure 1:
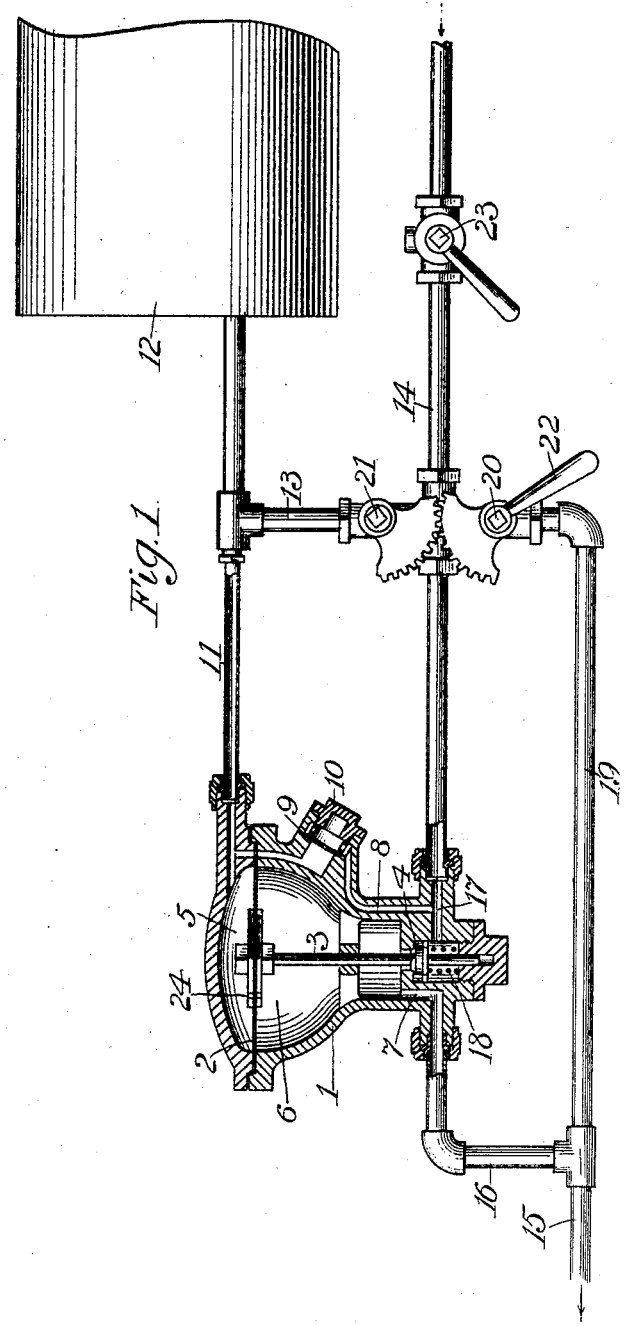

No. 796,506. PATENTED AUG. 8, 1905.
C. C. FARMER.
FLUID PRESSURE MECHANISM.
APPLICATION FILED JAN. 6, 1902.

2 SHEETS—SHEET 1.

WITNESSES:
Jas. B. MacDonald.

INVENTOR,
Clyde C. Farmer
by E. Wright
Att'y.

No. 796,506. PATENTED AUG. 8, 1905.
C. C. FARMER.
FLUID PRESSURE MECHANISM.
APPLICATION FILED JAN. 6, 1902.

2 SHEETS—SHEET 2.

WITNESSES:
Jas. B. MacDonald.

INVENTOR,
Clyde C. Farmer
by E. Wright
Att'y.

UNITED STATES PATENT OFFICE.

CLYDE C. FARMER, OF CHICAGO, ILLINOIS, ASSIGNOR TO THE WESTINGHOUSE AIR BRAKE COMPANY, OF PITTSBURG, PENNSYLVANIA, A CORPORATION OF PENNSYLVANIA.

FLUID-PRESSURE MECHANISM.

No. 796,506.            Specification of Letters Patent.            Patented Aug. 8, 1905.

Application filed January 6, 1902. Serial No. 88,568.

*To all whom it may concern:*

Be it known that I, CLYDE C. FARMER, a citizen of the United States, residing in Chicago, county of Cook, State of Illinois, have invented or discovered a certain new and useful Improvement in Fluid-Pressure Mechanism, of which improvement the following is a specification.

My invention relates to fluid-pressure apparatus, and has for its object to provide a device by means of which a certain given rate of increase in pressure may be obtained in a chamber or compartment having a variable capacity.

In the operation of the automatic air-brake as now used on railway-cars it sometimes happens that when releasing the brakes in the usual way by increasing the pressure in the train-pipe one or more of the triple valves of the train will stick and not move readily to the release position. This often results in locked wheels for the one or more cars on which these defective triple valves are located, causing a great amount of annoyance and delay, as well as flat and ruined wheels. It is therefore desirable that the brake apparatus of cars should be tested from time to time, so that any such defective triple valves may be detected and sent in for repairs before they have caused much damage. As is well known by those familiar with the art, the triple valve moves to service position to apply the brakes when the train-pipe pressure is reduced and is moved back to release position by increasing the train-pipe pressure when it is desired to release the brakes. As the movement of the triple-valve piston depends upon the difference in pressure of the auxiliary-reservoir air upon one side and the train-pipe air upon the other side, it is necessary that the train-pipe pressure be increased at a certain rate greater than the leakage around the triple-valve piston in order to return the valve to its release position. In the ordinary operation of the brakes by the manipulation of the engineer's brake-valve it is found that the minimum rate of increase in train-pipe pressure to which any triple valve would be subjected at the time of releasing brakes in ordinary service would be about ten pounds per minute, and any valve in which the leakage around its piston is so great that it will not promptly respond to this minimum rate of increase in train-pipe pressure should be termed "defective" and not be allowed in a train.

My invention is particularly adapted to be applied as a testing device to detect such defective triple valves and is adapted to be inserted between the end of the train-pipe of any number of cars coupled together in a train and a source of constant pressure, which may be the reservoir of a yard plant or the main reservoir of a locomotive. My invention is not limited to this particular use, however, but is adapted for general application wherever it is desired to secure a given rate of increase in pressure in a conduit or compartment of variable capacity or subject to variable leakage, for it will be observed that the capacity of the train-pipe to be tested will vary with the leakage and the number of cars in the train.

My invention therefore consists in a valvular device adapted to be inserted between a conduit or compartment of variable capacity and a source of pressure and to give a certain predetermined rate of increase of pressure in said compartment.

My invention also consists in means for varying the predetermined rate of increase of pressure and in certain other combinations and arrangement of parts, as hereinafter more fully described and claimed.

Figure 2:
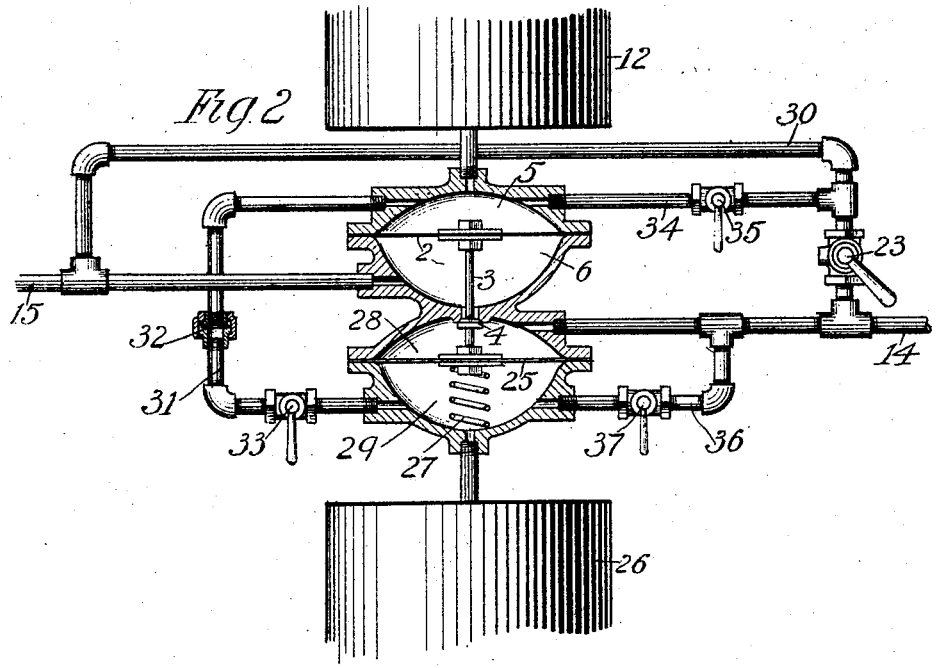

In the accompanying drawings, Figure 1 illustrates one form of my invention, the valve device being shown in section. Fig. 2 is a sectional view showing a modified form of my improvement, and Fig. 3 is a view showing still another modification.

Referring now to the construction shown in Fig. 1, the casing 1 of my improved valve device contains the movable abutment or diaphragm 2, having a stem 3, carrying a valve 4, located in a chamber below the valve-seat, and a light spring 18 normally holds the valve seated when the pressures on the opposite sides of the diaphragm are equal. The chamber 6 below the diaphragm and above the valve-seat is connected by port 7 and branch pipe 16 with pipe 15, which is adapted to be connected to the train-pipe or other compartment of variable capacity in any convenient manner, as by an ordinary coupling. The chamber below the valve is connected by a port 17 with the main pressure-supply pipe 14, containing the operating-valve 23, which may be merely a three-way cock, as shown. The chamber 5 above the diaphragm 2 is connected by a pipe 11 with a small reservoir 12, which constitutes merely an enlargement of said chamber 5, giving a certain determinate capacity. This chamber is connected with the main pressure-supply pipe by a passage 8, in which is located a disk or diaphragm 9, having a small perforation controlling the rate of flow of fluid therethrough. The diaphragm 9 is held in place by a movable screw-cap 10, which is provided with a perforated annular extension bearing directly upon the diaphragm or disk. As a means for securing different predetermined rates of increase of pressure diaphragms or disks provided with orifices of different sizes may be used, and the rate of flow may be varied at any time, as desired, by merely removing the cap and replacing the disk with another having an orifice of the desired size. A pipe 13, having a valve 21, connects pipes 14 and 11, and a by-pass pipe 19, having valve 20, makes a direct connection from the main pressure-supply pipe 14 to the outlet-pipe 15. Valves 20 and 21 may be provided with coacting segmental racks or other means whereby both valves may be opened or closed by one movement of the handle 22. It will now readily be seen that with a supply of fluid at constant pressure—for instance, ninety pounds, corresponding to main-reservoir pressure—the capacity of chamber 5 (including reservoir 12) and the size of the perforation through the diaphragm 9 may be so calculated as to give almost any desired rate of increase in pressure in said chamber 5. If a lower rate of increase of pressure should be desired than could be obtained in practice by the use of the perforated disk 9, the chamber 5 may be connected to the train-pipe through a small restricted opening, such as 24; but this provision will not ordinarily be necessary. The operation of this form of my device is as follows: Valves 20 and 21 are opened and the train-pipe and all parts of my improved valve device are charged to the normal train-pipe pressure of seventy pounds. A reduction of, say, ten pounds is then made in the train-pipe for the purpose of applying the brakes, and valves 20 and 21 are then closed, leaving the pressure throughout at sixty pounds. The operating-valve is then set in position to recharge the train-pipe and main-reservoir air enters through pipe 14, passage 8, and perforated diaphragm 9, increasing the pressure in chamber 5 at the desired rate—ten pounds per minute. As this pressure above the diaphragm 2 begins to increase above the train-pipe pressure below the diaphragm, it will be forced downward, opening the regulating-valve 4 and allowing air from the main reservoir to flow through to the train-pipe, increasing the pressure therein at the same rate as in the chamber 5 above the diaphragm. The width of the opening of regulating-valve 4 depends upon the length of train-pipe to be charged and the amount of leakage; but as found in actual practice the valve opens the proper amount to give the same rate of increase in pressure in the train-pipe or other compartment as in the chamber of given capacity above the diaphragm. This rate of increase in train-pipe pressure is sufficient to cause all the triple valves that are in good condition to release, and if upon inspection it should be found that the brakes on any one or more cars are sticking it would indicate that the triple valves upon these are defective and should be repaired.

In Fig. 2 is illustrated a modified form of my improvement employing an additional diaphragm 25, which is attached to the valve-stem 3 below the valve 4, forming the two chambers 28 and 29 in the casing. The small reservoir 26 is connected to chamber 29 and constitutes an enlargement thereof, thus forming a chamber of a given capacity. The chambers are connected up as follows: chamber 28 directly with supply-pipe 14, chamber 29 with the supply-pipe 14, through a pipe 36, having a valve 37, chamber 6 directly with outlet-pipe 15, chamber 5 with by-pass pipe 30, through pipe 34, having valve 35, and chamber 29 also with chamber 5, through pipe 31, having valve 33 and a perforated disk or diaphragm 32, forming a restricted opening. The spring 27 keeps the valve 4 closed when the pressures are equal on the opposite sides of the diaphragms. With this form of my device the operation is as follows: When the pipe 14 is connected to the main reservoir or source of supply and the pipe 15 with the train-pipe or other compartment of variable capacity, main-reservoir pressure is admitted to chambers 28 and 29, valves 23 and 33 being closed and valve 37 open. By means of operating-valve 23 the train-pipe and chambers 5 and 6 are then charged to a certain pressure—for instance, seventy pounds—valve 35 being open. A reduction of ten pounds is then made and valves 35 and 37 are closed, the diaphragm 25 being exposed to main-reservoir pressure on both sides and the diaphragm 2 to the reduced train-pipe pressure. Then as valve 33 is opened fluid under pressure from chamber 29 will flow through restricted opening in disk 32 at a predetermined rate to chamber 5. This will cause the valve 4 to open a sufficient amount to allow the pressure in the train-pipe and chamber 6 to increase at a rate corresponding to the combined rate of decrease in chamber 29 and increase in chamber 5.

Figure 3:
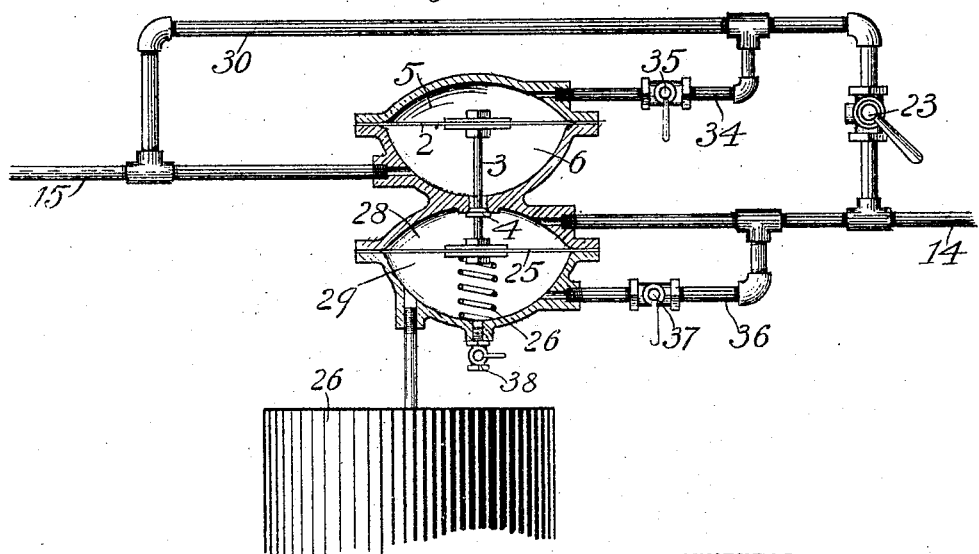

The construction shown in Fig. 3 is similar to that shown in Fig. 2, with the exception that the pressure from chamber 29 is discharged directly to the atmosphere through a measuring-cock 38 instead of into the chamber 5. Otherwise the operation of this modification is the same as that heretofore described.

It will now be seen that my invention may be operated either by increasing or decreasing the pressure at a certain rate or by a combination of these methods. My invention, therefore, is not limited to any specific construction, as various modified forms may be devised for practicing the same and involving the same principles.

Having now described my invention, what I claim as new, and desire to secure by Letters Patent, is—

1. In a fluid-pressure mechanism, a valve controlling communication between a source of fluid-pressure and a compartment of variable capacity, a movable abutment for operating said valve and means for varying the pressure on one side of the abutment at a predetermined rate.

2. In a fluid-pressure mechanism, the combination of a valve for controlling communication between a source of pressure and a compartment, a movable abutment exposed on opposite sides to fluid-pressure for operating said valve, and means for varying the pressure on one side of the abutment at a predetermined rate.

3. In a fluid-pressure mechanism, the combination of a valve for controlling communication between a source of pressure and a compartment, a movable abutment for operating said valve, said abutment being exposed on one side to the pressure in said compartment, and means for varying the pressure on the other side of the abutment at a predetermined rate.

4. In a fluid-pressure mechanism, the combination of a valve for controlling communication between a source of pressure and a compartment, a movable abutment for operating said valve, said abutment being exposed on one side to the pressure in said compartment, and means for increasing the pressure on the other side of the abutment at a predetermined rate.

5. In a fluid-pressure mechanism, the combination of a valve for controlling communication between a source of fluid-pressure and a compartment of variable capacity, a movable abutment for governing the operation of said valve, said abutment being exposed on one side to the pressure in said compartment, a chamber on the opposite side of said abutment, a passage leading from the source of fluid-pressure to said chamber, and means located in said passage for restricting the flow of fluid therethrough to a predetermined rate.

6. In a fluid-pressure mechanism, the combination of a valve for controlling communication between a source of fluid-pressure and a compartment of variable capacity, a movable abutment for operating said valve, one side of the abutment being exposed to the pressure in the compartment, a passage for establishing communication between the main source of fluid-pressure and the other side of the abutment, and removable means located in said passage for restricting the flow of fluid therethrough.

7. In a fluid-pressure mechanism, the combination of a valve for controlling communication between a source of fluid-pressure and a compartment of variable capacity, a movable abutment for operating said valve, one side of the abutment being exposed to the pressure in said compartment, and a chamber having a certain fixed capacity on the other side of the abutment, a passage leading from the source of fluid-pressure supply to said chamber, and restricting means located in said passage for limiting the rate of flow therethrough to a predetermined amount.

8. In a fluid-pressure mechanism, the combination of a valve for controlling communication between a source of fluid-pressure and a compartment of variable capacity, a movable abutment for operating said valve, one side of the abutment being exposed to the pressure in said compartment, a passage leading from the other side of the abutment to the source of fluid-pressure, and a perforated disk located in said passage.

9. In a fluid-pressure mechanism, the combination of a valve for controlling communication between a source of fluid-pressure and a compartment of variable capacity, a movable abutment exposed on one side to the pressure in said compartment for operating said valve, the other side of the abutment communicating with the main pressure-supply through a restricted passage and also through a larger valve-controlled passage, and another valve-controlled passage for establishing direct communication between the source of pressure and the said compartment.

10. In a fluid-pressure mechanism, the combination of a valve for controlling communication between a source of fluid-pressure and a compartment of variable capacity, a movable abutment for operating said valve, one side of said abutment being exposed to the pressure in said compartment, a closed chamber on the other side of the abutment, a passage leading from the source of pressure to said chamber and means for restricting the flow of fluid therethrough to a predetermined rate.

11. In a fluid-pressure brake mechanism, the combination of a valve for controlling communication between the main reservoir and train-pipe, a movable abutment for operating said valve, one side of said abutment being exposed to train-pipe pressure, a passage leading from the main reservoir to the chamber on the opposite side of the abutment, and means for restricting the flow of fluid therethrough to a predetermined rate.

12. In a fluid-pressure brake mechanism, the combination of a valve for controlling communication between the main reservoir and the train-pipe, a movable abutment exposed on one side to train-pipe pressure for operating said valve, a closed chamber on the other side of the abutment, a passage leading from the main reservoir to said chamber, and means located in said passage for restricting the flow of fluid to a predetermined rate.

13. In a fluid-pressure mechanism, the combination of a valve for controlling communication from a source of fluid-pressure to a compartment of variable capacity, a chamber having communication with the source of fluid-pressure through a restricted passage, and means subject to the opposing pressures of the compartment and of the said chamber for governing the operation of said valve.

14. In a fluid-pressure mechanism, the combination of a valve for controlling communication from a source of fluid-pressure to a compartment of variable capacity, a movable abutment for governing the operation of said valve, said abutment being exposed on one side to the pressure of said compartment, and a restricted passage leading from the source of fluid-pressure to a chamber on the opposite side of said abutment.

15. In a fluid-pressure brake mechanism, the combination of a valve for controlling communication from the main reservoir to the train-pipe, a chamber communicating with the main reservoir through a restricted passage, and means subject to the opposing pressures of the train-pipe and of the said chamber for governing the operation of said valve.

16. In a fluid-pressure brake mechanism, the combination with a valve for controlling the feed from the main reservoir to the train-pipe, of a movable abutment for governing the operation of said valve, one side of said abutment being exposed to train-pipe pressure, a passage leading from the main reservoir to the chamber on the opposite side of the abutment, and means located in said passage for restricting the flow therethrough.

In testimony whereof I have hereunto set my hand.

CLYDE C. FARMER.

Witnesses:
   JAS. B. MACDONALD,
   R. F. EMERY.